United States Patent [19]

Binder

[11] 4,087,713

[45] May 2, 1978

[54] SLIP-RINGLESS CLAW-POLE DYNAMO ELECTRIC MACHINE, PARTICULARLY AUTOMOTIVE-TYPE ALTERNATOR

[75] Inventor: Georg Binder, Stuttgart, Germany

[73] Assignee: Robert Bosch GmbH, Stuttgart, Germany

[21] Appl. No.: 712,835

[22] Filed: Aug. 9, 1976

[30] Foreign Application Priority Data

Sep. 27, 1975 Germany .............................. 2543196

[51] Int. Cl.² .............................................. H02K 1/22
[52] U.S. Cl. .................. 310/266; 310/68 R; 310/71; 310/263
[58] Field of Search ............... 310/68, 68 D, 263, 266, 310/71, 89, 90, 67, DIG. 6, 171

[56] References Cited

U.S. PATENT DOCUMENTS

| | | | |
|---|---|---|---|
| 2,928,963 | 3/1960 | Bertsche | 310/266 |
| 3,329,841 | 7/1967 | Binder | 310/68 |
| 3,539,841 | 11/1970 | Riff | 310/68 |
| 3,548,226 | 12/1970 | Sato | 310/263 |
| 3,586,892 | 6/1971 | Sato | 310/68 |
| 3,610,979 | 10/1971 | Thomas | 310/263 |
| 3,629,630 | 12/1971 | Hollywood | 310/68 |
| 3,918,784 | 11/1975 | Lemke | 339/17 C |
| 3,989,332 | 11/1976 | Patterson, Jr. | 339/17 C |

*Primary Examiner*—R. Skudy
*Attorney, Agent, or Firm*—Flynn & Frishauf

[57] ABSTRACT

To prevent connecting difficulties in the manufacture of automotive-type alternators of the claw pole generator type, resilient spring compression terminals, or contacts are formed, respectively, on a terminal board or on a voltage regulator terminal for engagement with a spring terminal element connected to the fieldwinding so that mere placement of the terminal board or a voltage regulator, respectively, against the springy terminal connections will effect electrical connection and not requiring any internal connecting steps within the alternator and especially at locations of impaired accessibility since they are hidden behind the terminal board, or voltage regulator, respectively.

15 Claims, 6 Drawing Figures

SLIP-RINGLESS CLAW-POLE DYNAMO ELECTRIC MACHINE, PARTICULARLY AUTOMOTIVE-TYPE ALTERNATOR

The present invention relates to dynamo electric machines, and more particularly to slip-ringless alternator structures particularly useful as alternators in automotive vehicles of compact construction.

Alternators of known types and having claw pole structures with both field and armature windings on the stator and a rotating interposed claw pole cause difficulties in mechanical construction since the space to make electrical connections from the field winding to outside terminals or terminal boards is very limited. The rotating claws must be magnetically isolated from each other. To then connect the ends of the field windings of such a machine to a terminal board or terminal plate, as is required in order to make the necessary electrical connections to the armature as well as to the field, requires working at the end of a small, restricted space of essentially ring-shaped cross section which is formed between the stator and the field windings. Thus, the mechanical step of effecting the connection is difficult and hence time-consuming and expensive. It has previously been proposed to make the connections outside of the housing of the machine by extending the wires and then carrying them through openings in the end bells. If a terminal plate is mounted within the machine inside of the end bells, these wires may be carried therethrough, or they can be bunched behind the terminal board. This introduces difficulties and possible malfunction later; on the other hand, if the connections are made directly to the terminal board, they should be made at the back side thereof so that access to make connections is impeded by the terminal board itself.

Subject matter of the present invention: Briefly, resiliently engageable compression contact terminal elements are located inside the machine, connected to the terminal ends of the windings, for example by being secured to a portion of the stator structure. The resiliently engageable compression contact terminals face matching contact terminals which may also be resilient compression elements so that, when terminal supports, typically a terminal board is installed in the machine, the matching contact elements or terminals will engage with each other and resiliently make contact automatically, without requiring further working or connection steps. The resilient compression contact terminal elements may either be carried by the stator structure, by the terminal board, or by other elements and devices to be assembled with the dynamo electric machine, for example a housing plate of a voltage regulator secured directly to the shell or an end plate of the dynamo electric machine. Connection of the winding ends of the field winding thus is effected automatically during assembly of the machine.

The engaging contacts or terminals may be located at either side of the machine; if it is in the form of an automotive alternator, it has, customarily, only one projecting shaft, the other end of the shaft being carried in a blind bearing in the end bell. If the contact side is at the end bell adjacent the drive side, then it is possible to effect connection of the ends of the field winding in a similar manner and under the same conditions as with machines which have slip-rings; the terminal board thus may be a standard terminal board, or at least its connection arrangement may be same for slip-ringless, claw pole-type alternators as well as for slip-ring-type alternators. If the connection of the field winding is made at the drive side, the entire space between the bore of the stator and of the terminal board is available to effect a reliable electrical and mechanical connection, for example by a compression fitting, by soldering, welding, brazing, or the like.

The invention will be described by way of example with reference to the accompanying drawings, wherein.

Figure 1:
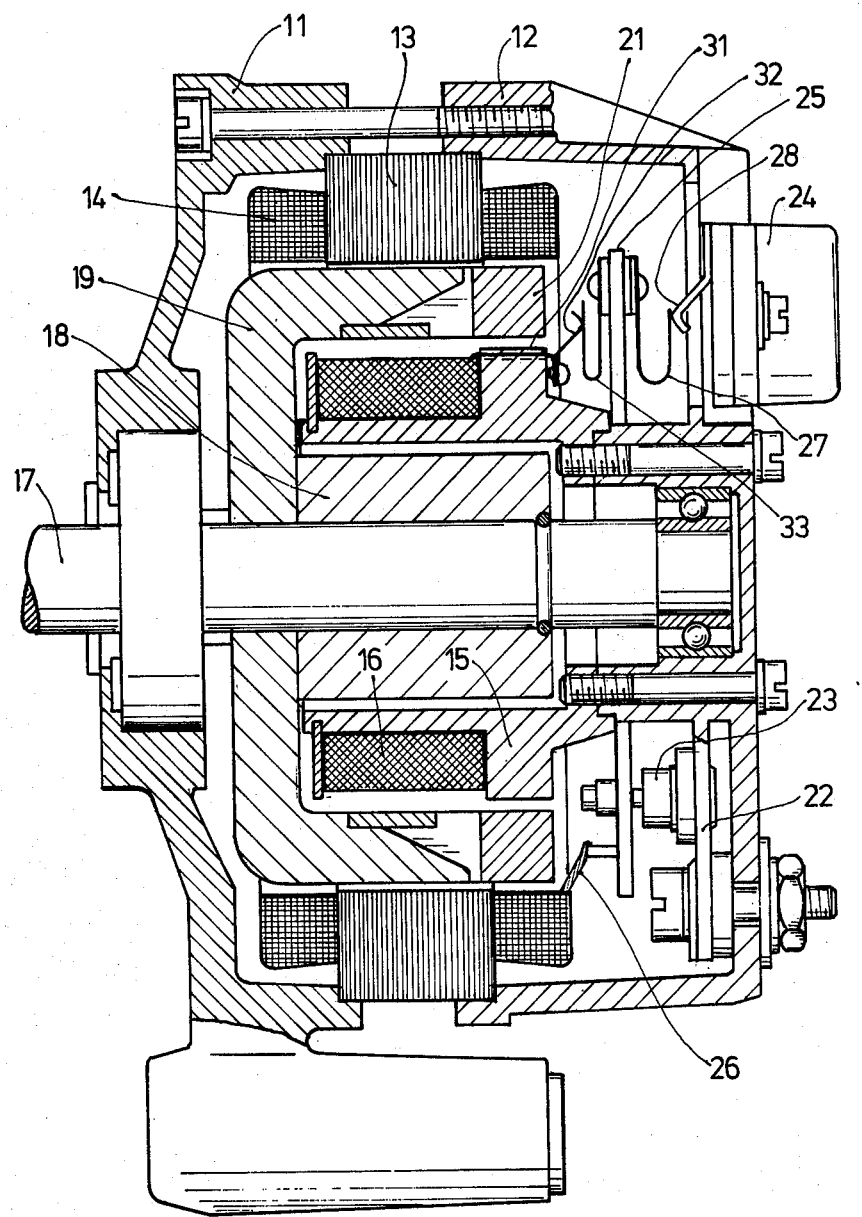
FIG. 1 is a schematic cross-sectional view through an automotive-type alternator having a claw-pole rotor structure.

The slip-ringless dynamo electric machine, as illustrated, is constructed for use as an alternator for automotive installation. The housing generator has a drive-side end bell 11, a remote or opposite end bell 12 and a stator structure 13 which is clamped between the end bells 11, 12 by clamping bolts, as well known. The stator 13, built up of core laminations, is wound with the respective armature windings 14. End bell 12 also has a stationary field with interior poles 15 secured thereto. The field poles 15 are wound with a field or exciter winding 16. Shaft 17 is journalled in the end bells 11 and 12. The shaft carries a core element 18 and claw poles 19, 21. The end bell 12, remote from the driven shaft end, is further formed with a cooling plate 22 to which rectifier diodes 23 are attached; a voltage regulator 24 is likewise attached to plate 22. Only a single diode 23 is illustrated in FIG. 1; customarily, six main current diodes and three field rectifier diodes are used in alternators for automotive use, having three or six-phase windings. A connecting circuit board 25 is additionally located within the end bell structure to which - not shown in FIG. 1 - printed circuit paths are secured in order to provide terminals for the ends 26 of the windings of the armature 14 and for connection to the respective electrodes of diodes 23.

In accordance with the invention, a compression spring contact or terminal 27 is secured to the printed circuit plate 25. When the alternator is completely assembled, spring contact 27 engages a corresponding compression spring contact terminal element 28 secured to the voltage regulator 24 to provide a resiliently engaged surface-to-surface contact therewith.

In accordance with the invention, additionally, the ends 31 of the field winding 16 are connected to compression terminal springs 32 forming contacts for the voltage regulator. The terminal springs are secured to the stationary inner pole 15. The compression springs 32 are in electrical surface-to-surface contact with corresponding compression spring elements 33 secured to printed circuit board 25 at the side opposite to that at which terminal 27 is mounted. Electrical connection from the field 16 thus extends over compression springs 32 and the matching terminals 33 secured to printed circuit board 25.

FIG. 1 shows the connection between one terminal DF of the voltage regulator 24 with the associated end of the winding of the field 16; the voltage regulator has the additional function of supporting the terminal 28. The connection is as follows: Compression spring terminal 28 of the voltage regulator 24 - compression springs 27 and 33 secured to printed circuit board 25 and connected together; compression spring 32 — end 31 of winding of field 16.

Figure 2:
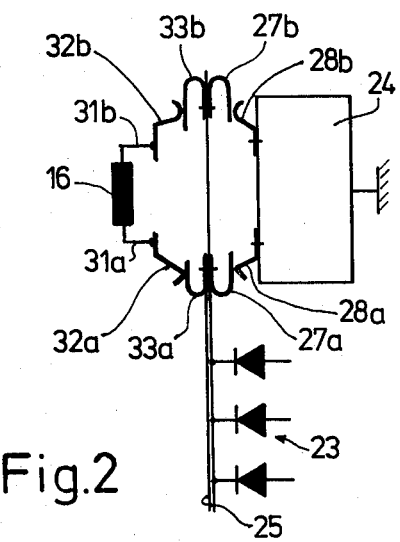
FIG. 2 is a schematic circuit diagram of the alternator field circuit of FIG. 1 in combination with a voltage regulator and rectifying diode arrangement.

The circuit connection is schematically shown in FIG. 2. One end of the winding 31*a* of the field 16 is connected to a first compression spring terminal 32*a* which, in turn, is in engagement with a matching spring terminal 33*a* secured to printed circuit board 25 and forming a second compression spring terminal. The spring terminal 33*a* is connected through the printed circuit board 25 with another, similar spring terminal 27*a* forming a fifth compression spring terminal, at the opposite side thereof which, in turn, is connected to a compression terminal 28*a*. The second compression spring terminal 33*a* on the printed circuit board is further connected by means of printed circuit paths to the rectifier diodes which form the rectifier array 23. The fifth compression spring terminal 27*a* is electrically connected to the associated compression spring terminal 28*a* forming the D+ terminal of the voltage regulator 24. The other end 31*b* of the winding 16 of the field is connected to a third compression terminal element 32*b* which, in turn, is connected to a fourth compression spring terminal 33*b* secured to the printed circuit board. The compression spring terminal 33*b* is mechanically and electrically connected to a sixth compression spring terminal 27*b* which, in turn, has electrical surface-to-surface contact with a corresponding matching compression spring terminal element 28*b* of the voltage regulator 24 and forming the DF terminals thereof.

Figure 3:
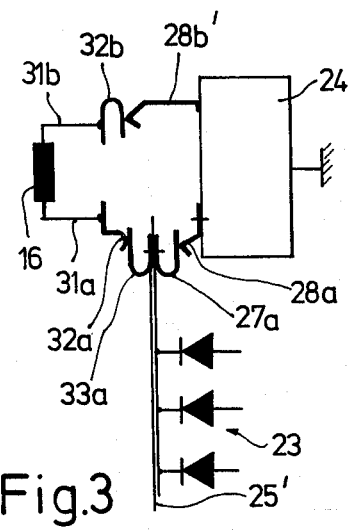
FIG. 3 is a different embodiment of a schematic circuit diagram of the alternator field structure in combination with a voltage regulator.

FIG. 3 shows another arrangement in schematic circuit diagram; it differs from the arrangement of FIG. 2 in that the end of the winding 31*b* of the field 16 is connected to a third compression spring terminal 32*b* which is directly in surface-to-surface engagement with the associated compression spring terminal 28*b'* of the voltage regulator 24. This terminal is extended and the printed circuit board 25' can then be somewhat smaller.

Figure 4:
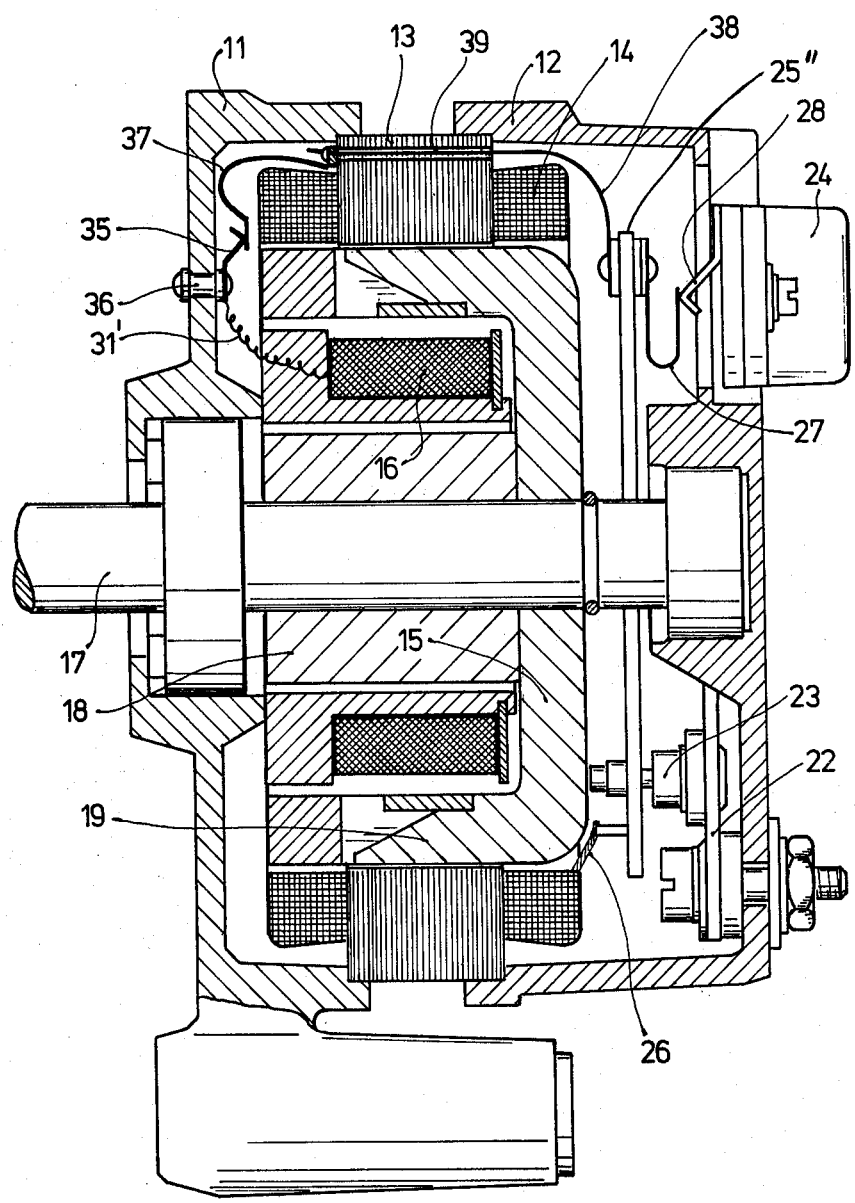
FIG. 4 is an axial schematic cross section through another type of alternator structure in which the claw poles are mounted at the shaft end remote from the driven end.

The arrangement of FIG. 4 differs from that of FIG. 1 in that the claw pole is secured to shaft 17 not at the drive side of the shaft but rather at the end of the shaft which is journalled in a blind bearing and which forms the side of the alternator which is accessible for mounting of circuit elements and connections since it is not blocked by the drive pulley (not shown) customarily connected to shaft 17. The ends 31' of the field winding 16 are connected to compression contact elements in the form of terminal springs 35 which are secured to the drive side bell 11. The compression spring terminals 35 are attached to the bell 11 by suitable attachment elements 36, for example insulated screws or rivets, or similar elements formed with insulating sleeves or made of an insulating material, for example nylon. The spring terminals 35 are in direct electrical connection with further compression spring terminal elements 37 which are connected, in insulated manner, to the stator pole system 13. The further compression spring terminals 37 are connected to electrical connecting means in the form of connecting wires 38 which extend to the printed circuit board 25", where they are electrically connected to compression spring terminal elements 27. The stator lamination package 13 is formed with bores 39 through which the connecting wires 38 are led. They are insulated with respect to the stator, for example by embedding the wires in a putty or other similar material, or placing them in a plastic sleeve. The embodiment of FIG. 4 is preferably used when the field system 16 is secured to the end bell 11 which is located at the drive side of the alternator rather than at the end bearing in end bell 12.

Figure 5:
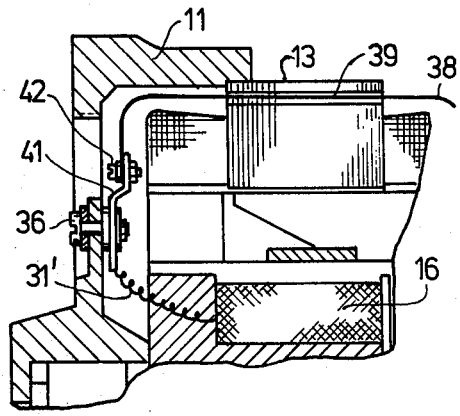
FIG. 5 is a fragmentary sectional view, to an enlarged scale, of a connection arrangement for the structure of FIG. 4.
Figure 6:
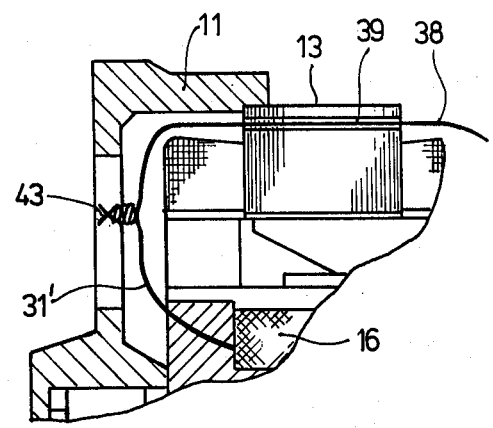
FIG. 6 is a fragmentary view similar to FIG. 5 and illustrating another embodiment.

Various changes and modifications may be made, for example; FIGS. 5 and 6 illustrate variations of connection of the field 16 using the basic structure of FIG. 4. The compression spring contact terminals 35, 37 can be exchanged for different types of connections. FIG. 5 illustrates an insulated screw or rivet connection 36 secured to the drive-side end bell 11 and attached to the winding end 31' of field winding 16. The insulated screw 36, or rivet, as the case may be, is attached to a projecting lug 41 to which wire 38 is connected by a screw connection 42, accessible to the outside through a ventilating opening in end bell 11. The connection is accessible before assembly of the drive pulley to the shaft of the alternator; it is also possible to merely connect a terminal pigtail wire 31' from the winding 16 to wire 38 by a twisted and soldered, or crimped connection 43, as illustrated in FIG. 6. In a preferred form, the wires 31 and 38 are merely twisted together and a reliable permanent electrical connection is then effected by deformation, squeezing, crimping, soldering and welding, or by first stripping the wire and then placing a crimped cap thereover, which is insulated.

I claim:

1. Slipring-less dynamo electric machine having
   a frame including a stator and having an armature core (13) and an armature winding thereon, and a field core (15) and a field winding (16) thereon, radially spaced from the armature winding and defining a cylindrical gap therewith;
   end bells (11, 12) securing said armature core and said field core in position in the machine;
   a rotor including a claw pole (19) extending into the gap between the armature and the field windings, and an inner pole (18) surrounding the shaft (17) of the machine,
   terminal support means (24, 25) secured to the frame of the machine;
   and means to connect the winding ends of the field winding (16) with the associated terminals on the terminal support means comprising resiliently engaged compression contact elements (32, 33, 35).

2. Machine according to claim 1, wherein the compression contact elements include resilient contact springs (32) secured to the field core (15) in position facing the terminal support means.

3. Machine according to claim 2, wherein (FIGS. 1 and 2) the terminal support means comprises a printed circuit board (25) having printed circuit paths located thereon, and rectifier elements (23) are provided to rectify the output of the armature winding (14);
   and wherein a first compression contact element (32*a*) is connected to one terminal (31*a*) of the field winding, a second resilient compression contact element (33*a*) is secured to the printed circuit board (25) and in engagement with the first compression contact element, a branch of the printed circuit being connected to the second compression element for connection thereof to the rectifier element;

a third compression contact element (32b) is connected to the other terminal (31b) of the field winding (16);

and a fourth resilient compression contact element (33b) is secured to the printed circuit board (25) and in engagement with the third compression contact element.

4. Machine according to claim 3, in combination with a voltage regulator (24), said voltage regulator carrying surface-to-surface compression contact elements (28a, 28b), the compression contact elements (28a, 28b) of the voltage regulator being in electrical connection with the second and fourth resilient compression elements (33a, 33b).

5. Machine according to claim 4, further comprising fifth (27a) and sixth (27b) compression contact elements electrically connected to the second (33a) and fourth (33b) compression elements and located at the side of the printed circuit board opposite the second and fourth compression elements, said fifth and sixth compression elements being in surface-to-surface contact engagement with the compression contact terminal elements (28a, 28b) of the voltage regulator.

6. Machine according to claim 2, in combination with a voltage regulator (24) and wherein the dynamo electric machine is an automotive-type alternator;

the terminal means comprises a terminal board (25) having a printed circuit thereon, rectifier elements (23) are provided to rectify the output of the armature winding (14), and wherein (FIGS. 1 and 3) a first compression contact element (32a) is connected to one terminal (31a) of the field winding (16), a second resilient compression contact element (33a) is secured to the printed circuit board (25') and in engagement with the first compression contact element, a branch of the printed circuit being connected to the second compression contact element (33a) for connection thereof to the rectifier means (23), a third compression contact element (32b) is connected to another terminal (31b) of the field winding (16) and the voltage regulator (24) is provided with a fourth compression contact element (28b') in engagement with the third compression contact element.

7. Machine according to claim 1, wherein (FIGS. 4–6) the compression contact elements comprise pressure contact elements (35) secured to the end bell (11) adjacent the drive side of the shaft (17) of the machine, and means (31, 36) connecting the field winding to said pressure contact elements (35).

8. Machine according to claim 5, wherein (FIG. 4) additional pressure contact elements (37) are provided, secured to the stator (13) of the dynamo electric machine;

the terminal support means includes a printed circuit board (25");

and connection means (38) extending from said further pressure contact elements to the printed circuit board (25").

9. Machine according to claim 8, wherein said connection means comprise a connecting wire (38), and the stator core (13) is formed with a bore (39) through which said connecting wire (38) extends.

10. Machine according to claim 1, wherein (FIG. 4; FIGS. 5, 6) the terminal ends (31) of the field winding are brought out from the field pole system to a terminal position (36) adjacent the end bell (11) which is closest to the drive side of the shaft (17) of the dynamo electric machine;

the terminal support means includes a printed circuit board (25");

a connecting wire (38) is provided connected at one end to the printed circuit board (25");

and mechanical, positive connection means (FIG. 5: 42; FIG. 6: 43) are provided connected to the other end of said connecting wire (38) and said terminal position (36) to thereby connect the printed circuit board (25") to the terminal end (31') of the field winding.

11. Machine according to claim 10, wherein the positive connection means comprises a screw connection.

12. Machine according to claim 10, wherein the positive connection means comprises a crimped connection (43).

13. Machine according to claim 10, wherein the positive connection means comprises a twist-and-solder connection (43).

14. Machine according to claim 10, wherein the positive connection means comprises a spot weld connection.

15. Machine according to claim 10, wherein the end bell (11) adjacent the drive side of the shaft (17) of the machine is formed with ventilating openings; and the positive connection means is located in alignment with at least one of the ventilating openings to permit external access thereto.

* * * * *